United States Patent Office 3,681,319
Patented Aug. 1, 1972

---

3,681,319
AMINE ADDITION SALTS OF 5-[p-(2-PYRIDYL-SULFAMYL)-PHENYLAZO]-SALICYLIC ACID
Bernt Jabes Lindberg, Uppsala, Sweden, assignor to Aktiebolaget Pharmacia, Uppsala, Sweden
No Drawing. Continuation of application Ser. No. 603,437, Dec. 21, 1966. This application Jan. 30, 1970, Ser. No. 7,357
Claims priority, application Sweden, Dec. 21, 1965, 16,526/65
Int. Cl. A61k 37/00; C07c 107/06
U.S. Cl. 260—156
6 Claims

ABSTRACT OF THE DISCLOSURE

Amine addition salts of 5-[p-(2-pyridylsulfamyl)-phenylazo]-salicylic acid are provided. The amine is represented by the formula:

A—R wherein A is either

or 4-morpholino, or
piperidino; and wherein R is either tris-hydroxymethyl-methyl, 2-hydroxyethyl, 2-hydroxypropyl, 3-hydroxypropyl, 2-methoxyethyl, 3,4,5,6-tetrahydroxyhexanal - 2 - yl, or 2,3,4,5,6-pentahydroxyhexyl; and $R_1$ and $R_2$ are either hydrogen, methyl, ethyl, or 2-hydroxyethyl. The present compounds can be used for the treatment of ulcerative colitis and rheumatoid arthritus.

REFERENCE TO COPENDING CASES

This case is a continuation of copending application Ser. No. 603,437, filed Dec. 21, 1966, and now abandoned.

5 - [p - (2 - pyridylsulfamyl)-phenylazo]-salicylic acid is known for its excellent therapeutical properties. The compound is, at present mainly used as an agent for the treatment of ulcerative colitis:

5-[p-(2-pyridylsulfamyl) - phenylazo] - salicylic acid is very difficult to dissolve in water and is therefore usually administered in the form of tablets. Diluted aqueous solutions of the compound in concentrations of less than 1% have been used, inter alia, against rheumatoid arthritis, by local injection direct into the joints (Nordisk Medicin, 39, No. 33, p. 1509/1948).

Previous attempts have been made to produce more concentrated solutions of 5-[p-(2-pyridylsulfamyl)-phenylazo]-salicylic acid in the hope that these may give a better therapeutical effect. Thus, salts have been prepared from metal ions such as sodium and potassium. Attempts to produce salts of organic bases, however, have failed. One disadvantage associated with the metal salts produced hitherto is that their aqueous solutions present a pH which is too high for therapeutical use in the concentrations necessary for such use. This disadvantage is removed or considerably reduced by means of the present invention.

The invention is concerned with novel readily soluble salts of 5-[p-(2-pyridylsulfamyl)-phenylazo]-salicylic acid (Salazopyrin®, Azulfidine®) of the formula

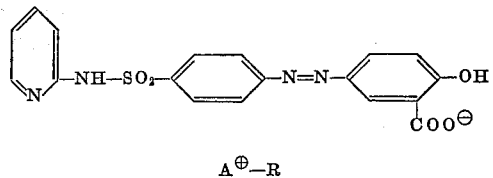

$A^{\oplus}$—R wherein A is a member selected from the group consisting of (1) 

wherein $R_1$ and $R_2$ are each a member selected from the group consisting of hydrogen, methyl, ethyl and 2-hydroxyethyl, (2) 4-morpholino and (3) piperidino and R is a member selected from the group consisting of tris-hydroxymethyl-methyl, 2-hydroxyethyl, 2-hydroxypropyl, 3-hydroxypropyl, 2-methoxyethyl, 3,4,5,6 - tetrahydroxyhexanal-2-yl and 2,3,4,5,6-pentahydroxyhexyl.

The invention is also concerned with a process of producing the novel salts. According to the invention, the novel salts are prepared by reacting stoichiometric amounts of 5-[p-(2-pyridylsulfamyl)-phenylazo]-salicylic acid with an amine of the formula

A—R wherein A and R have each the above significance.

The conversion can be effected by mixing equimolar amounts of the two reaction ingredients together, particularly in the presence of a solvent. Possible solvents are water, ethyl alcohol or methyl glycol. Thus one proceeds by stirring or shaking the two reactants together in the suitable solvent, preferably in water, until a clear solution is formed.

The desired salt can also be prepared from salts of the amine e.g. the hydrochloride or sulphate, by double displacement with salts of 5-[p-(2-pyridylsulfamyl)-phenylazo]-salicylic acid such as the silver salt or barium salt, preferably in aqueous solution. The difficultly soluble silver chloride or barium sulfate can then be isolated by filtration and the filtrate then worked up in the usual manner.

The salts obtained according to the invention are difficult to crystallize in that they are obtained as viscose oils which only crystallize when stirred with alcohol or ether. A number of the salts are very hygroscopic. They are readily soluble in water at therapeutically acceptable pH values.

The obtained amine salts are distinguished for their very good therapeutical properties. On administering 5-[p-(2-pyridylsulfamyl)-phenylazo]-salicylic acid as methyl-glucamine salt intravenously in rats, serum concentrations are obtained which are directly dependent on dosage.

The maximum dosage without being fatal is in the order of 150 mg./kg. which gives a level of 1000 μ/ml. Acute intravenous LD 50 lies in the order of 300 mg./kg.

It can be mentioned by way of example that when administering 5-[p-(2-pyridylsulfamyl) - phenylazo]-salicylic acid orally as crystals in suspension very low serum levels, 10-20μ/ml., are obtained. If the methylglucamine salt is administered to rats orally in aqueous solution, serum levels are obtained which on average are 10 times higher.

When 5-[p-(2-pyridylsulfamyl)-phenylazo] - salicylic acid is administered rectally as crystals in suspension and in suppositories, the same low blood concentration is obtained in both instances as when the compound is taken perorally in suspension. When administering the methylglucamine salt of 5-[p-(2-pyridylsulfamyl)-phenylazo]-salicylic acid in solution rectally particularly high and constant serum levels were obtained. A high level was already reached after 10 minutes and a maximum level corresponding to 380μ/ml. after 120 minutes. Compared with peroral supply of methylglucamine salt, serum levels at least twice as high were obtained and at least 20 times as high, compared with oral administration of suspension.

The invention will be described in the following with the following examples.

EXAMPLE 1

N-methyl-(1)-d-glucamine salt 100 g. (0.25 mol) of 5-[p-(2-pyridylsulfamyl)-phenylazo]-salicylic acid were dissolved in 2.5 liters of hot methyl glycol, after which the obtained solution was mixed with a solution of 49 g. (0.25 mol) methylglucamine in 625 ml. of hot methyl glycol. The mixture was concentrated under vacuum to give a highly viscous oil which was boiled with ethanol. The ethanol was decanted and the oil dried over sulphuric acid, whereby it gradually crystallized. The yield was 145 g. Equivalent weight 326.5 (calculated 296.5).

*Analysis* (percent): Salazopyrine, 60.1 (calculated 67.1); moisture, 9.0; ash, 0.14.

EXAMPLE 2

Diethanolamine salt 270 g. (0.678 mol) of 5-[p-(2-pyridylsulfamyl)-phenylazo]-salicylic acid were heated with 1 liter of 99.5 percent ethanol with boiling, after which the mixture was added with 71.2 g. (0.678 mol) of diethanolamine dissolved in 130 ml. of 99.5 percent ethanol. The mixture was boiled for 5 hours, 200 ml. of 99.5 percent ethanol and somewhat extra diethanolamine being added during the time. An amount of undissolved acid was filtered from the hot mixture after which the said mixture was allowed to cool slowly. After being left for one night in a refrigerator, 330 g. of diethanolamine salt were obtained subsequent to filtering and washing with 200 ml. of 99.5 percent ethanol. Equivalent weight 256 (calculated 252.5) percent of 5-[p-(2-pyridylsulfamyl)-phenylazo] - salicylic acid 79.1 (calculated 79.1).

A series of amine salts were produced in a similar manner from the following amines, the experimentally found equivalent weight being set forth by the side of the theoretical equivalent weight:

|  | Found | Calculated |
|---|---|---|
| Methoxyethylamine | 244 | 237 |
| Ethanolamine | 257 | 230 |
| 1-amine-2-propanol | 281 | 297 |
| 2-amino-2-methyl-propanol | 273 | 244 |
| 2-dimethylamino-ethanol | 265 | 244 |
| 2-diethylamino-ethanol | 271 | 268 |
| 1-dimethylamino-propanol-(2) | 265 | 251 |
| 1-diethylamino-propanol-(2) | 278 | 265 |
| 3-diethylamino-propanol-(1) | 270 | 265 |
| N-methyl-2,2-imino-diethanol | 279 | 259 |
| N-ethyl-2,2-imino-diethanol | 276 | 267 |
| Triethanolamine | 258 | 252 |
| Trishydroxy-methylamino methane | 286 | 260 |
| Piperidino-ethanol | 266 | 264 |
| 3-piperidino-propanol | 288 | 271 |
| 3-(5-morpholino)-propanol | 281 | 272 |
| Glucosamine | 298 | 289 |

I claim:
1. As a compound, the acid addition salt of 5-[p-(2-pyridylsulfamyl)-phenylazo]-salicylic acid with an amine of the formula

A—R wherein A is a member selected from the group consisting of
(a)

wherein $R_1$ and $R_2$ are each a member selected from the group consisting of hydrogen, methyl, ethyl and 2-hydroxyethyl
(b) 4-morpholino and
(c) piperidino and
R is a member selected from the group consisting of trishydroxymethyl-methyl, 2-hydroxyethyl, 2-hydroxypropyl, 3-hydroxypropyl, 2-methoxyethyl, 3,4,5,6-tetra hydroxyhexanal-2-yl and 2,3,4,5,6-pentahydroxyhexyl.

2. A compound as claimed in claim 1 wherein the amine is N-methyl-(1)-d-glucamine.

3. A compound as claimed in claim 1, wherein the amine is diethanolamine.

4. A compound as claimed in claim 1, wherein the amine is methoxyethylamine.

5. A compound as claimed in claim 1, wherein the amine is 3-(4-morpholino)-propanol.

6. A compound as claimed in claim 1, wherein the amine is glucosamine.

References Cited

UNITED STATES PATENTS

| 2,144,552 | 1/1939 | Shonle | 260—501.17 |
| 2,222,354 | 11/1940 | Lichty | 260—501.17 X |
| 2,278,499 | 4/1942 | Smith et al. | 260—501.17 |
| 2,396,145 | 3/1946 | Anders et al. | 260—156 |
| 2,486,177 | 10/1949 | Korner | 260—501.17 X |
| 2,490,703 | 12/1949 | Paige | 260—156 X |
| 3,088,871 | 5/1963 | Pfeiffer | 260—501.17 X |
| 3,181,994 | 5/1965 | Dubnick | 260—501.17 X |
| 3,392,204 | 7/1968 | Albert | 260—501.17 X |

FOREIGN PATENTS

| 2ª Add'n 827 | 4/1965 | France | 260—501.17 |
| 407,159 | 8/1966 | Switzerland | 260—501.17 |

FLOYD D. HIGEL, Primary Examiner

U.S. Cl. X.R.

424—226